(12) United States Patent
Ge et al.

(10) Patent No.: US 9,185,756 B2
(45) Date of Patent: Nov. 10, 2015

(54) LOAD DRIVING DEVICE AND SYSTEM, LIMITING POINT CONTROL METHOD AND DEVICE

(75) Inventors: Liang'an Ge, Hangzhou (CN); Guichao Hua, Hangzhou (CN); Xiaoli Yao, Hangzhou (CN); Yang Liu, Hangzhou (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 176 days.

(21) Appl. No.: 13/995,817

(22) PCT Filed: Aug. 23, 2011

(86) PCT No.: PCT/CN2011/078751
§ 371 (c)(1),
(2), (4) Date: Jun. 19, 2013

(87) PCT Pub. No.: WO2012/088903
PCT Pub. Date: Jul. 5, 2012

(65) Prior Publication Data
US 2013/0285625 A1  Oct. 31, 2013

(30) Foreign Application Priority Data
Dec. 30, 2010  (CN) .......................... 2010 1 0616067

(51) Int. Cl.
*H05B 37/02* (2006.01)
*H05B 33/08* (2006.01)

(52) U.S. Cl.
CPC ........ *H05B 33/0815* (2013.01); *H05B 33/0827* (2013.01); *Y02B 20/347* (2013.01)

(58) Field of Classification Search
CPC ........... H05B 33/0815; H05B 33/0827; H05B 39/083; H02M 1/44; H02M 5/293
USPC ......... 315/152, 158, 224, 257, 291, 246, 309, 315/312; 323/222, 224, 267, 269, 271–273, 323/282–290
See application file for complete search history.

(56) References Cited

U.S. PATENT DOCUMENTS 5,821,703 A * 10/1998 Callahan et al. ............... 315/317
6,864,641 B2 *  3/2005 Dygert .......................... 315/216
(Continued)

FOREIGN PATENT DOCUMENTS

CN    101340760 A    1/2009
CN    201616931 U   10/2010

OTHER PUBLICATIONS

International Search Report (in Chinese with English translation) and Written Opinion (in Chinese) for PCT/CN2011/078751, mailed Sep. 22, 2011; ISA/CN.

*Primary Examiner* — Rajnikant Patel
(74) *Attorney, Agent, or Firm* — Harness, Dickey & Pierce, P.L.C.

(57) ABSTRACT

A load driving device and system, and a limiting point control method and device. The load driving device comprising: a voltage/current regulative main circuit placed under the control of an output current controller, for use in conducting a voltage conversion on an input voltage, and in supplying electric power to a subsequent load unit; a sampling unit connected to an output terminal of the main circuit, for use in sampling an output feature parameter of the main circuit; the output current controller, for use in controlling a limiting point of the main circuit, and on the basis of the adjustment direction of the limiting point and on changes of the output feature parameters of the main circuit before and after an adjustment, determining a steady working point for the main circuit, and controlling the main circuit to work at the steady working point. The load driving device and system enable an increase in driver reliability and a reduction in circuit complexity.

14 Claims, 7 Drawing Sheets

(56) References Cited

U.S. PATENT DOCUMENTS

| | | | |
|---|---|---|---|
| 6,870,328 B2* | 3/2005 | Tanabe et al. | 315/291 |
| 7,327,051 B2* | 2/2008 | Ito et al. | 307/10.8 |
| 7,362,592 B2* | 4/2008 | Yang et al. | 363/21.13 |
| 7,847,783 B2* | 12/2010 | Liu et al. | 345/102 |
| 7,928,856 B2* | 4/2011 | Jacubovski et al. | 340/653 |
| 8,035,315 B2* | 10/2011 | Zhao et al. | 315/299 |
| 2009/0015759 A1 | 1/2009 | Honbo | |
| 2009/0085901 A1 | 4/2009 | Antony | |

* cited by examiner

LOAD DRIVING DEVICE AND SYSTEM, LIMITING POINT CONTROL METHOD AND DEVICE

CROSS-REFERENCE TO RELATED APPLICATIONS

This application is a 371 National Stage application of PCT international application PCT/CN2011/078751, filed on Aug. 23, 2011, which claims the priority of Chinese Patent Application No. 201010616067.X, entitled "LOAD DRIVING DEVICE AND SYSTEM, CURRENT LIMIT CONTROL METHOD AND DEVICE", filed with the Chinese State Intellectual Property Office on Dec. 30, 2010, both of which are incorporated herein by reference in their entirety.

FIELD OF THE INVENTION

The invention relates to the field of circuit, and in particular to a load driving device and a load driving system.

BACKGROUND OF THE INVENTION

Most of the existing Light Emitting Diode (LED) luminaries have the structures which is designed based on the conventional gas discharge lamp and Tungsten lamp. The driving scheme which follows the conventional idea includes: providing one driver for one light source, and using a conventional AC/DC conversion technique with single-path or multi-path output. As shown in FIG. 1, a lighting device includes a light source and a driver, and is controlled by a distribution switch. As shown in FIG. 1, the driver is provided nearby the light source inside the lighting device.

Specifically, FIG. 2 shows a circuit structure of an LED lighting device. In FIG. 2, a previous output voltage adjustable voltage source 201 samples the minimum value of the drain voltages of adjustment transistors Q1~Qn in the post stage multi-path linear adjustment current-limiting circuit 203 via a minimum value sampling circuit 202, and a feedback control is performed based on the minimum value by an output voltage control circuit 204. In this way, the minimum value is kept to a small value, and the output voltage Vo of the output voltage adjustable voltage source 201 is always little larger than the voltage of the LED load with the highest voltage in the multi LED loads, and thus the linear adjustment current-limiting circuit 203 always has the minimum power consumption approximately while ensuring that the constant current driving of the current limit is performed by each LED load. The driver of the lighting device includes the output voltage adjustable voltage source 201, the minimum value sampling circuit 202 and the output voltage control circuit 204; and the light source unit includes a multiple of LED compositions and a multiple of linear adjustment current-limiting circuits (a LED branch includes a LED composition and a corresponding linear adjustment current-limiting circuit).

However, the above circuit structure has the following disadvantages.

Firstly, in order to facilitate the minimum value sampling circuit of the driver to perform a voltage sampling on the post stage circuit, the linear adjustment current-limiting circuit 203 of each LED branch often needs to be enclosed inside the driver, the loss of the adjustment transistor is large when the voltage difference between the multiple of LED branches is large, resulting in serious heat of the driver. Moreover, the driver is generally placed nearby the LED light source inside the LED lighting device, thus the temperature thereof will be higher, which affects the reliability of the driver seriously.

Secondly, the output voltage control circuit 204 of the previous output voltage adjustable voltage source 201 needs to sample the voltage of the post stage circuit composed of a LED and the corresponding linear adjustment current-limiting circuit 203, so that the wiring between the previous output voltage adjustable voltage source 201 and the post stage circuit is complicated. Moreover, when an open circuit fault occurs in a certain LED load, the drain voltage of the linear adjustment transistor is zero. Therefore, it is necessary to further provide an open circuit protection for each LED load, so as to ensure that other LED loads in which no fault occurs can operate normally in this case, which further increases the complexity of the circuit.

SUMMARY OF THE INVENTION

In view of this, the technical problem to be solved by the invention is to provide a load driving device and a load driving system, so as to improve the reliability of the driver and reduce the complexity of the circuit.

To this end, an embodiment of the invention adopts the following technical solution.

A load driving device is provided according to an embodiment of the invention, and the device includes:

a voltage and current regulative main circuit adapted to perform a voltage conversion on an input voltage under the control of an output current controller, and supply electric power to a load unit in a post stage;

a sampling unit connected to an output terminal or two output terminals of the voltage and current regulative main circuit, and adapted to sample an output characteristic parameter of the voltage and current regulative main circuit and transmit to an output current controller the sampled signal obtained by the sampling; and the output current controller having an input terminal connected to an output terminal of the sampling unit, and adapted to control a current limit of the voltage and current regulative main circuit, determine a steady-state operating point of the voltage and current regulative main circuit based on an adjustment direction of the current limit and on a variation in the output characteristic parameter of the voltage and current regulative main circuit before and after an adjustment of the current limit, and control the voltage and current regulative main circuit to work at the steady-state operating point.

The voltage and current regulative main circuit may include:

a switch converter having a first output terminal serving as a first output terminal of the voltage and current regulative main circuit and a second output terminal serving as a second output terminal of the voltage and current regulative main circuit, and adapted to perform the voltage conversion on the input voltage under the control of a current loop or a voltage loop;

the current loop adapted to sample an output current of the switch converter, and control the output current of the switch converter based on the current limit, in the case that the switch converter is controlled based on the sampled current; and the voltage loop adapted to sample an output voltage of the switch converter, and control the output voltage of the switch converter based on a voltage limit, in the case that the switch converter is controlled based on the sampled voltage, wherein the output current controller is adapted to control the current limit of the voltage and current regulative main circuit by controlling the current limit of the current loop.

The output characteristic parameter may be an output voltage, a variation rate of the output voltage, or an output power.

Specifically, the output current controller may be adapted to:

adjust the current limit of the voltage and current regulative main circuit by a preset step size; determine the steady-state operating point of the voltage and current regulative main circuit based on the current limit or the output characteristic parameter before and after the adjustment of the current limit, in the case that it is determined that the difference in the output characteristic parameter of the voltage and current regulative main circuit before and after the adjustment is greater than a preset difference threshold; and control the voltage and current regulative main circuit to work at the steady-state operating point.

A load driving system is further provided according to an embodiment of the invention, and the system further includes:

a voltage and current regulative main circuit adapted to perform a voltage conversion on an input voltage under the control of an output current controller, and supply electric power to a load unit in a post stage;

a load unit including at least one load branch, a first end of the load branch being connected to a first end of the load unit and a second end of the load branch being connected to a second end of the load unit, wherein the first end of the load unit is connected to a first output terminal of the voltage and current regulative main circuit and the second end of the load unit is connected to a second output terminal of the voltage and current regulative main circuit;

a sampling unit connected to an output terminal of the voltage and current regulative main circuit, and adapted to sample an output characteristic parameter of the voltage and current regulative main circuit and transmit to an output current controller the sampled signal obtained by the sampling; and the output current controller having an input terminal connected to an output terminal of the sampling unit, and adapted to control a current limit of the voltage and current regulative main circuit, determine a steady-state operating point of the voltage and current regulative main circuit based on an adjustment direction of the current limit and on a variation in the output characteristic parameter of the voltage and current regulative main circuit before and after the adjustment of the current limit, and control the voltage and current regulative main circuit to work at the steady-state operating point.

The load branch may include a set of loads connected in series and a current-limiting circuit of the load branch.

The current-limiting circuit may include:

a first adjustment transistor and a resistor connected to the first adjustment transistor in series, wherein two ends of the resistor are connected to two input terminals of a current-limiting controller respectively, an output terminal of the current-limiting controller controls an output impedance of the first adjustment transistor, so as to control the current in the corresponding load branch to be not greater than a preset current value; or the current-limiting circuit may be a current regulative diode.

A method for controlling a current limit of a voltage and current regulative main circuit is further provided according to an embodiment of the invention, and the method includes:

adjusting a current limit of a voltage and current regulative main circuit by a preset step size;

determining a steady-state operating point of the voltage and current regulative main circuit based on the current limit or a output characteristic parameter before and after the adjustment, in the case that it is estimated that the difference in the output characteristic parameter of the voltage and current regulative main circuit before and after the adjustment is greater than a preset difference threshold; and controlling the voltage and current regulative main circuit to work at the steady-state operating point.

The method may further include:

returning to the step of adjusting the current limit to decrease the current limit of the voltage and current regulative main circuit by the preset step size, in the case that it is determined that the difference in the output characteristic parameter of the voltage and current regulative main circuit before and after the adjustment is equal to 0; or returning to the step of adjusting the current limit to increase the current limit of the voltage and current regulative main circuit by the preset step size, in the case that it is determined that the difference in the output characteristic parameter of the voltage and current regulative main circuit before and after the adjustment is not equal to 0 and is smaller than the preset difference threshold.

The determining the steady-state operating point of the voltage and current regulative main circuit based on the current limit or the output characteristic parameter before and after the adjustment may include:

comparing the values of two current limits before and after the adjustment, and setting a current limit with a smaller value as a current of the steady-state operating point and setting an output voltage of the voltage and current regulative main circuit corresponding to the current limit as the voltage of the steady-state operating point; or comparing the values of two output characteristic parameters before and after the adjustment, and setting a current limit of the voltage and current regulative main circuit corresponding to an output characteristic parameter with a smaller value as the current of the steady-state operating point and setting an output voltage of the voltage and current regulative main circuit corresponding to the current limit as the voltage of the steady-state operating point.

A device for controlling a current limit of a voltage and current regulative main circuit is further provided according to an embodiment of the invention, and the device includes:

an adjustment unit adapted to adjust a current limit of a voltage and current regulative main circuit by a preset step size;

a determination unit adapted to determine a steady-state operating point of the voltage and current regulative main circuit based on the current limit or an output characteristic parameter before and after an adjustment in the case that it is determined that the difference in the output characteristic parameter of the voltage and current regulative main circuit before and after the adjustment is greater than a preset difference threshold; and a control unit adapted to control the voltage and current regulative main circuit to work at the steady-state operating point.

The determination unit may include:

an estimating sub-unit adapted to estimate whether the difference in the output characteristic parameter of the voltage and current regulative main circuit before and after the adjustment is greater than 0 or whether the difference is greater than the preset difference threshold, and control the adjustment unit to decrease the current limit of the voltage and current regulative main circuit by the preset step size, in the case that it is estimated that the difference in the output characteristic parameter of the voltage and current regulative main circuit before and after the adjustment is equal to 0; control the adjustment unit to increase the current limit of the voltage and current regulative main circuit by the preset step size, in the case that it is estimated that the difference in the output characteristic parameter of the voltage and current regulative main circuit before and after the adjustment is not equal to 0 and is smaller than the preset difference threshold; control the determination sub-unit to determine the steady-state operating point, in the case that it is estimated that the difference in the output characteristic parameter of the voltage and current regulative main circuit before and after the adjustment is greater than the preset difference threshold; and a determination sub-unit adapted to determine the steady-state operating point of the voltage and current regulative main circuit based on the current limit or the output characteristic parameter before and after the adjustment.

Specifically, the determination sub-unit may be adapted to compare the values of two current limits before and after the adjustment, set a current limit with a smaller value as a current of the steady-state operating point and set an output voltage of the voltage and current regulative main circuit corresponding to the current limit with the smaller value as the voltage of the steady-state operating point; or the determination sub-unit may be adapted to compare the values of two output characteristic parameters before and after the adjustment, set a current limit of the voltage and current regulative main circuit corresponding to the output characteristic parameter with a smaller value as the current of the steady-state operating point and set an output voltage of the voltage and current regulative main circuit corresponding to the current limit as the voltage of the steady-state operating point.

An analysis of the technical effect of the above solutions is as follows.

In the load driving device and system, the input terminal of the sampling unit is connected to the output terminal of the voltage and current regulative main circuit, so as to sample the output voltage. In this way, the current-limiting circuit and the driving device in the load branch may be packaged separately, and the set distance between the driving device and the load unit may be increased, and thus the heat source of the driving device is reduced and the reliability of the driving device is improved.

Moreover, the electric energy transmission between the electric energy supplying unit and the load unit may be achieved by two connection wires, the wiring is simple, and thus the complexity of the circuit is reduced. Further, when the amount of the load branches is varied, for example, when a load branch is cut off or another branch is added, the voltage and current regulative main circuit may automatically adjust the output voltage via the sampling unit and the control of the output current controller, the constant-current driving of the other load branches is achieved. In this way, no open protection circuit needs to be provided for each load branch separately, thus the complexity of the circuit is further reduced and the cost is saved.

DETAILED DESCRIPTION OF THE INVENTION

Figure 1:
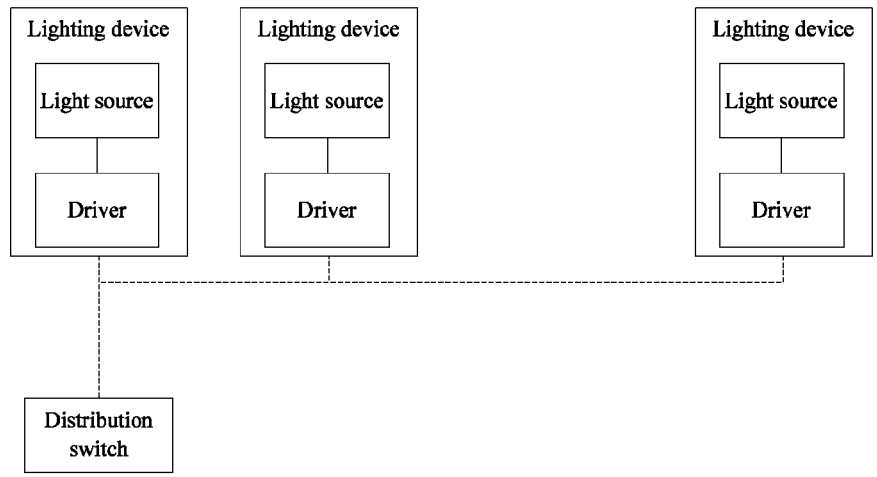
FIG. 1 is a schematic structural diagram of a lighting device in the prior art.
Figure 2:
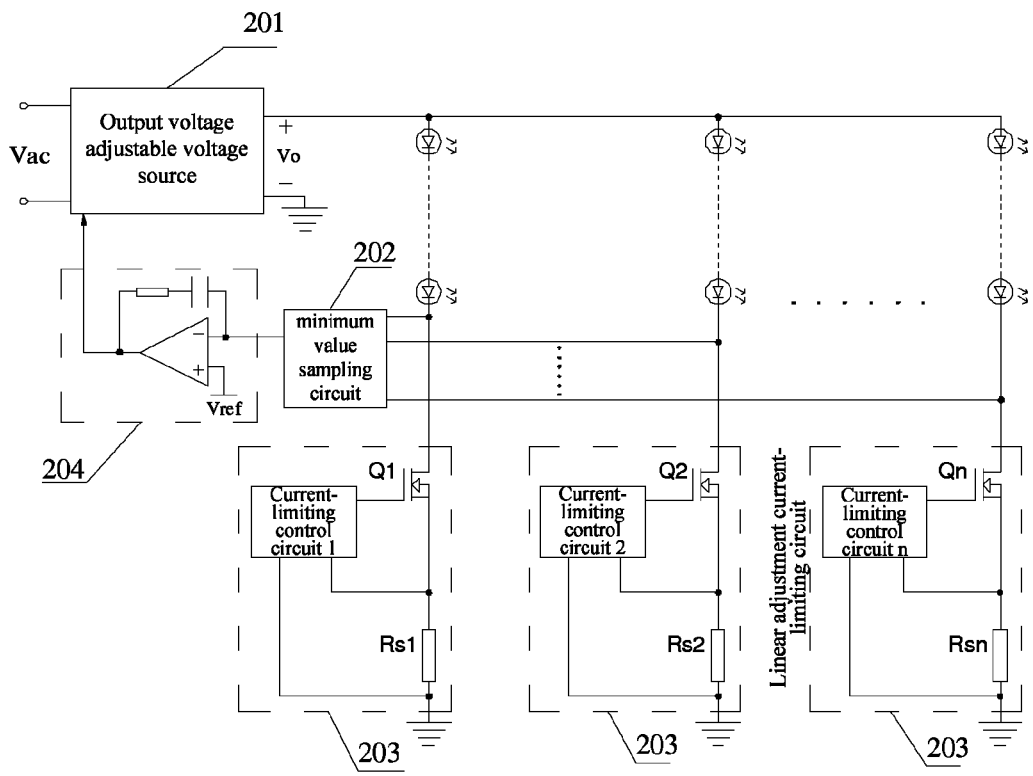
FIG. 2 is a schematic structural diagram of an LED lighting device in the prior art.

Specific implementations of a load driving device and a load driving system according to an embodiment of the invention will be described in detail in conjunction with the drawings hereinafter.

A load driving device according to an embodiment of the invention includes the following components:

a voltage and current regulative main circuit adapted to perform a voltage conversion on an input voltage under the control of an output current controller, and supply electric power to a load unit in a post stage;

a sampling unit connected to an output terminal or two output terminals of the voltage and current regulative main circuit, and adapted to sample an output characteristic parameter of the voltage and current regulative main circuit and transmit to an output current controller the sampled signal obtained by the sampling; and the output current controller having an input terminal connected to an output terminal of the sampling unit, and adapted to control a current limit of the voltage and current regulative main circuit, determine a steady-state operating point of the voltage and current regulative main circuit based on an adjustment direction of the current limit and on a variation in the output characteristic parameter of the voltage and current regulative main circuit before and after an adjustment of the current limit, and control the voltage and current regulative main circuit to work at the steady-state operating point.

The steady-state operating point refers to the current limit of the voltage and current regulative main circuit which differs from the sum Ir of the current limits of the LED load branches in the post stage by a preset difference threshold $\Delta I$, and the output voltage of the voltage and current regulative main circuit in this case. At this time, the output voltage approximates to the maximum load voltage in the post stage load branches. The range of the difference threshold $\Delta I$ may be set as $(\pm 0.1\% \sim \pm 20\%)$Ir.

The load voltage refers to a voltage across a set of loads in a load branch.

The difference $\Delta V$ between a maximum output voltage Vo1 and a current-limiting output voltage Vo2 of the voltage and current regulative main circuit is not smaller than the product of Vo2 and a set percent. The set percent may range from 1% to 50%. The current-limiting output voltage (Vo2) is an output voltage when the current limit Ic of the voltage and current regulative main circuit is just equal to the sum Ir of the current limits of the post stage LED loads.

Generally, two output terminals of the voltage and current regulative main circuit are respectively connected to two ends of the load unit and adapted to supply the power to the load unit. Specifically, the load unit includes at least one load branch. A first end of the load branch is connected to a first end of the load unit and a second end of the load branch is connected to a second end of the load unit. The first end and the second end of the load unit are respectively connected to a first output terminal and a second output terminal of the voltage and current regulative main circuit.

Thus, in the embodiment of the invention, the load driving system is formed of the load driving device together with the post stage load unit.

In this load driving device and system, the input terminals of the sampling unit is connected to the output terminals of the voltage and current regulative main circuit, and adapted to sample the output characteristic parameter. In this way, the current-limiting circuit and the driving device in the load branch may be packaged separately, and the set distance between the driving device and the load unit may be increased, such that the heat source of the driving device is reduced and the reliability of the driving device is improved.

Moreover, the electric energy transmission between the voltage and current regulative main circuit and the load unit may be achieved by two connection wires. Thus, the wiring is simple, and the complexity of the circuit is reduced. Further, when the amount of the load branch is varied, for example, when the load branch is cut off or another branch is added, the voltage and current regulative main circuit may automatically adjust the output voltage via the sampling unit under the control of the output current controller. It is achieved that if some load branches are cut off, the currents of the other load branches remain constant; and if some load branches are added, the currents of the existing load branches remain constant, and the current in the added load branch is equal to the current limit set in this load branch. With this, for the open circuit, no open protection circuit needs to be provided for each load branch separately, thus the complexity of the circuit is further reduced and the cost is saved.

The voltage and current regulative main circuit, the sampling unit and the output current controller can be packaged in combination, and are used as the driving device for driving the load unit. The load unit can be packaged separately. Further, the driving device may also be provided to package the sampling unit and the output current controller in combination; and package the voltage and current regulative main circuit separately. In this case, when a fault occurs in the voltage and current regulative main circuit, the replacement may be provided easily. Further, the load unit may be packaged into one or more units as required, which is not limited herein. For example, several load branches form one unit and the other load branches form other units. Alternatively, all the load branches may be packaged into one unit.

Here, the driving device provides a centralized control for these load units, such that the complexity of the circuit of the load driving system is reduced, and the implementation cost of the system is reduced. Further, since the driving device and the load unit are packaged respectively, the driving device does not need to be close to the load unit and is far away from the heat source, so that the environmental temperature of the driving device is decreased, the reliability of the driving device is improved, and thereby the reliability of the load driving system is improved.

The above driving device and the separately packaged load unit respectively correspond to the driver for driving the light source and the light source unit in a lighting system. Since the driver provides a centralized control for these light source units, the complexity of the circuit of the lighting system is reduced, and the implementation cost of the system is reduced. Further, the driver and the light source unit are packaged respectively, therefore the driver does not need to be close to the light source unit and is far away from the heat source, so that the environmental temperature of the driver is decreased, the reliability of the driver is improved, and thereby the reliability of the lighting system is improved.

Hereinafter, the implementation of the load driving device and system according to the embodiment of the invention will be described in more detail in conjunction with the embodiments.

Figure 3:
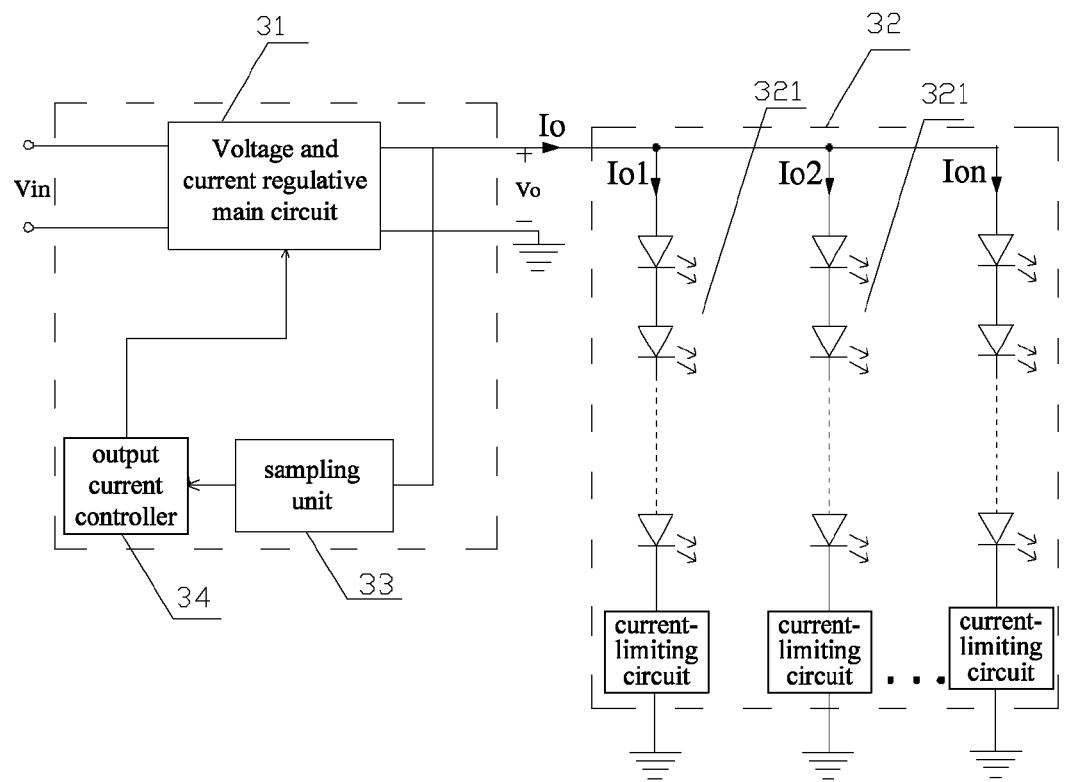
FIG. 3 is a schematic structural diagram of a load driving system according to an embodiment of the invention.

FIG. 3 is a schematic structural diagram of a load driving system according to an embodiment of the invention. As shown in FIG. 3, the system includes a voltage and current regulative main circuit 31, a load unit 32, a sampling unit 33, and an output current controller 34.

The voltage and current regulative main circuit 31 is adapted to perform a voltage conversion on an input voltage, and supply an electric power to a load unit in a post stage.

The load unit 32 includes at least one load branch, a first end of the load branch is connected to a first end of the load unit and a second end of the load branch is connected to a second end of the load unit. The first end of the load unit is connected to a first output terminal of the voltage and current regulative main circuit 31 and the second end of the load unit is connected to a second output terminal of the voltage and current regulative main circuit 32.

The sampling unit 33 is connected to an output terminal or two output terminals of the voltage and current regulative main circuit 31, and is adapted to sample an output characteristic parameter of the voltage and current regulative main circuit 31 and transmit to the output current controller 34 the sampled signal obtained by the sampling.

The output characteristic parameter may include an output voltage, a variation rate of the output voltage or an output power.

The output current controller 34 has an input terminal connected to an output terminal of the sampling unit 33, is adapted to adjust a current limit of the voltage and current regulative main circuit, determine a steady-state operating point of the voltage and current regulative main circuit based on an adjustment direction of the current limit and on a variation in the output characteristic parameter of the voltage and current regulative main circuit before and after the adjustment of the current limit, and control the voltage and current regulative main circuit to work at the steady-state operating point.

Figure 4:
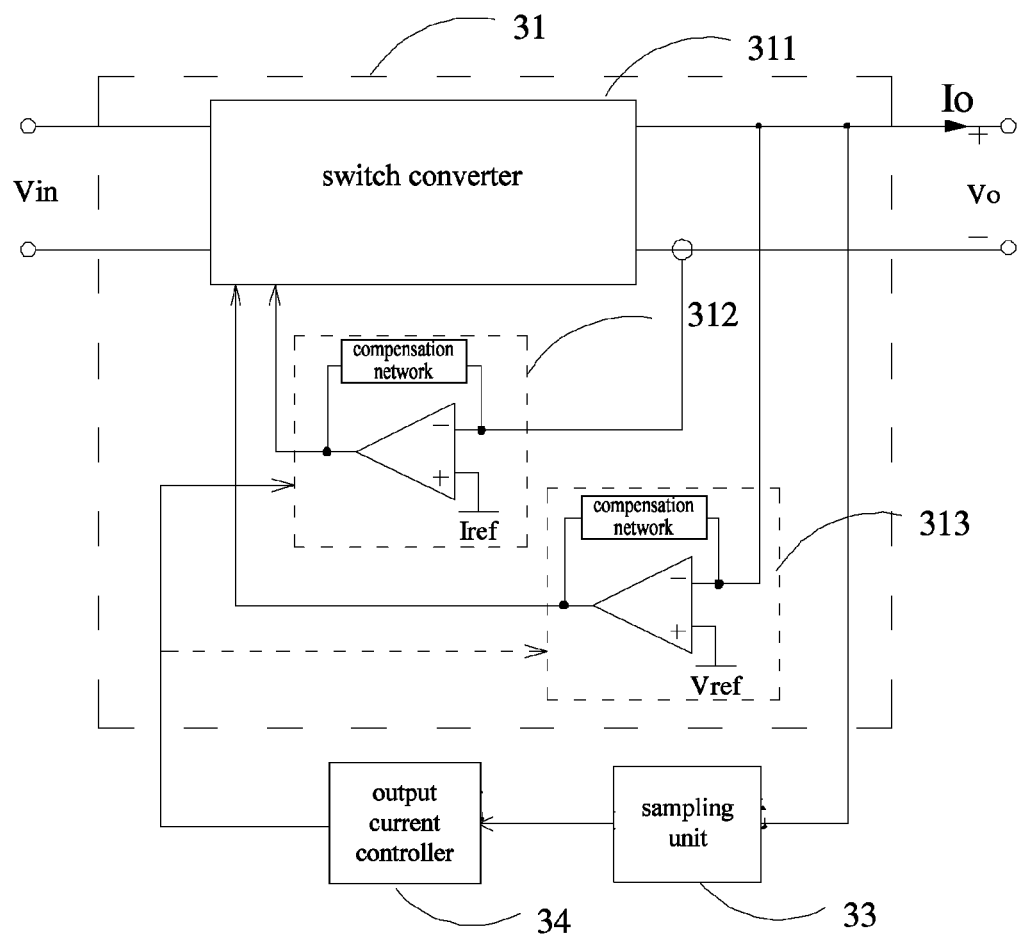
FIG. 4 is a schematic structural diagram of another load driving system according to an embodiment of the invention.

Generally, as shown in FIG. 4, the voltage and current regulative main circuit 31 may include a switch converter 311, the current loop 312, and the voltage loop 313.

The switch converter 311 has a first output terminal which is used as a first output terminal of the voltage and current regulative main circuit, and a second output terminal which is used as a second output terminal of the voltage and current regulative main circuit. The switch converter 311 is adapted to perform the voltage conversion on the input voltage under the control of a current loop 312 or a voltage loop 313.

The switch converter 311 may be an AC-DC converter or a DC-DC converter. That is to say, the input voltage Vin of the switch converter 311 may be an alternating voltage or a direct-current voltage, which is not limited here.

The current loop 312 is adapted to sample an output current of the switch converter 311, and control the output current of the switch converter 311 based on the current limit when the switch converter 311 is controlled based on the sampled current.

Specifically, as shown in FIG. 4, the current loop 312 may include an operational amplifier. An inverting input terminal of the operational amplifier is connected to the output terminal of the switch converter 311, so as to sample the output current; a preset current reference value Iref is inputted into a non-inverting input terminal; an output terminal is connected to the switch converter 311, so as to control the output current of the switch converter 311. A compensating network is connected between the output terminal and the inverting input terminal. The compensating network may be any compensating network for the closed-loop control circuit, so as to achieve the closed-loop control of the current loop 312 and the closed-loop adjustment of the output current.

The voltage loop 313 is adapted to sample an output voltage of the switch converter 311, and control the output voltage of the switch converter 311 based on a voltage limit when the switch converter 311 is controlled based on the sampled voltage.

Specifically, as shown in FIG. 4, the voltage loop 313 may include an operational amplifier. An inverting input terminal of the operational amplifier is connected to the output terminal of the switch converter 311, so as to sample the output voltage; a preset voltage reference value Vref is inputted to a non-inverting input terminal; an output terminal is connected to the switch converter 311, so as to control the output voltage of the switch converter 311. A compensating network is connected between the output terminal and the inverting input terminal. The compensating network may be any compensating network for the closed-loop control circuit, so as to achieve the closed-loop control of the voltage loop 313 and the closed-loop adjustment of the output voltage.

The current limit of the current loop 312 and the voltage limit of the voltage loop 313 may be varied under the control of the output current controller. Therefore, the output current controller 34 may control the current limit or the voltage limit of the voltage and current regulative main circuit by controlling the current limit of the current loop or the voltage limit of the voltage loop. For example, the output current controller 34 may set the current limit of the current loop as the current limit contained in the steady-state operating point by controlling the current loop in the voltage and current regulative main circuit 31, so that the voltage and current regulative main circuit 31 may work at the steady-state operating point. The output current controller 34 may also set the output voltage of the voltage and current regulative main circuit as the voltage limit corresponding to the steady-state operating point by controlling the voltage loop.

Further, as shown in FIG. 3, the load unit 32 may include at least one load branch 321. A first end of the load branch 321 is connected to a first end of the load unit and a second end of the load branch 321 is connected to a second end of the load unit; i.e., the load branches of the load unit are connected in parallel.

Each load branch may include a set of loads connected in series and a current-limiting circuit for the load branch. The current-limiting circuit is adapted to set a current limit of the load branch including the current-limiting circuit and control the current in the load branch to the current limit.

The set of loads may be the multiple LEDs connected in series as shown in FIG. 3, and may also be other direct-current load similar to LED, which is not limited herein.

Figure 5:
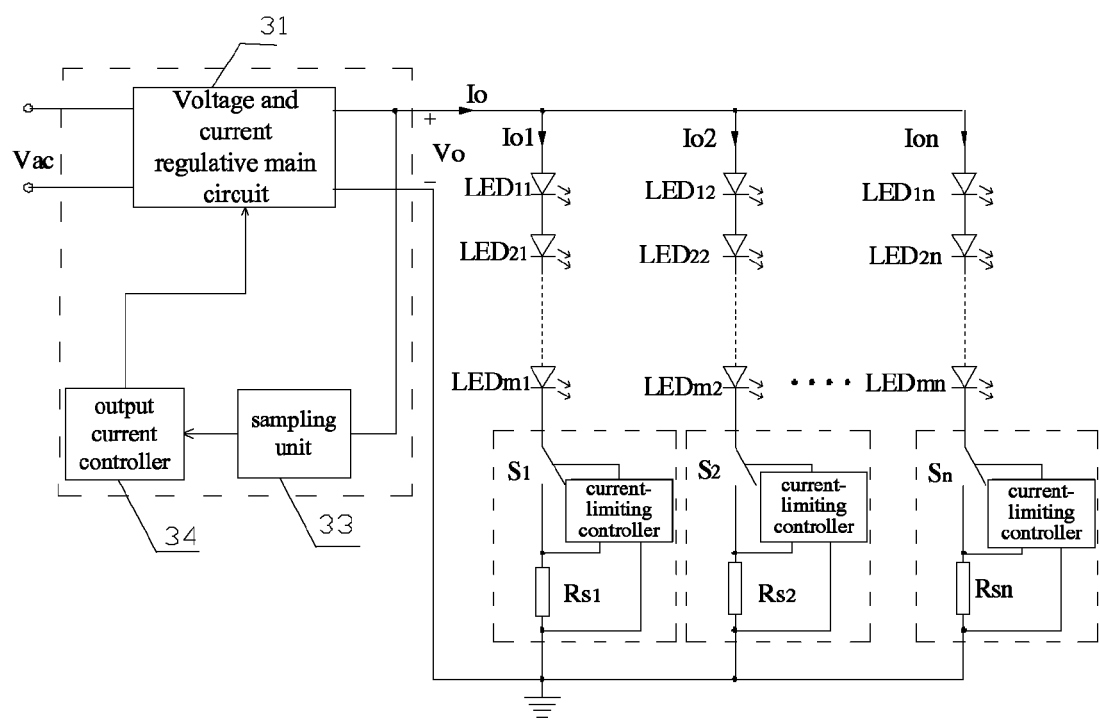
FIG. 5 is a schematic structural diagram of a load unit according to an embodiment of the invention.

The current-limiting circuit may be a linear adjustment circuit. Specifically, as shown in FIG. 5, each current-limiting circuit may include: a first adjustment transistor S (the first adjustment transistor in the first load branch is identified as S1, the first adjustment transistor in the second load branch is identified as S2, and so on) and a resistor Rs (the resistor in the first load branch is identified as Rs1, the resistor in the second load branch is identified as Rs2, and so on) connected to the first adjustment transistor S in series. The resistor Rs is adapted to sample the current in the corresponding load branch. Two ends of the resistor Rs are connected to two input terminals of the current-limiting controller respectively. An output terminal of the current-limiting controller controls the output impedance of the first adjustment transistor S. The current-limiting control circuit is adapted to control the first adjustment transistor S based on a sampled current signal of the resistor Rs, i.e., the current flowing in the resistor Rs, so that the current in the corresponding load branch is not greater than a preset current value, and the current limitation for the load branch is achieved. When the first adjustment transistor S works in the linear state, the current in the load branch is a direct current; and when the first adjustment transistor S works in the switching state or full-on state, the current in the load branch is a pulse chopping current (such as the PWM current) or a direct current.

The current-limiting circuit can also be implemented by a current regulating diode.

The current limits of the current-limiting circuits in different load branches can be the same or different, which is not limited here.

In the embodiment of the invention, the input terminal of the sampling unit is connected to the output terminal of the voltage and current regulative main circuit, so as to perform the sampling on the output voltage of the voltage and current regulative main circuit, rather than the sampling on each post stage load branch. Therefore, the current-limiting circuit of the load branch does not need to be packaged in the driving device, but may be provided in the load unit. For example, in the lighting system, the current-limiting circuit may be provided in the base plate of the LED load in the branch including the current-limiting circuit, so that the heat dissipation of the current-limiting circuit may be performed easily, and the driving device has a good heat dissipation performance because the current-limiting circuit is not packaged in the driving device.

Specifically, the output current controller can be implemented in a digital manner, and the control method for controlling the voltage and current regulative main circuit by the output current controller may include the following steps:

adjusting a current limit of a voltage and current regulative main circuit by a preset step size;

determining a steady-state operating point of the voltage and current regulative main circuit based on the current limit or a output characteristic parameter before and after the adjustment when it is estimated that the difference in the output characteristic parameter of the voltage and current regulative main circuit before and after the adjustment is greater than a preset difference threshold; and controlling the voltage and current regulative main circuit to work at the steady-state operating point.

Figure 6:
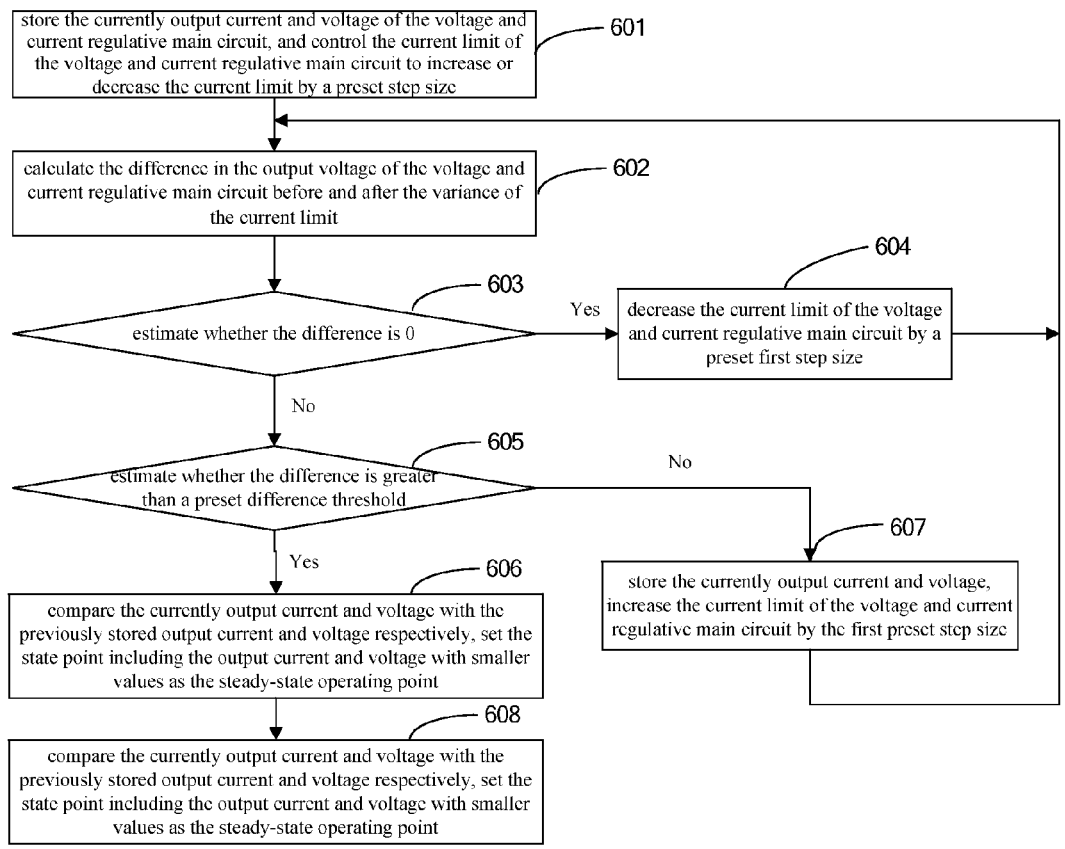
FIG. 6 is a schematic flow chart of a method for controlling a voltage and current regulative main circuit according to an embodiment of the invention.

Specifically, when the output characteristic parameter sampled by the sampling unit is the output voltage, the control method in the output current controller may include the following steps as shown in FIG. 6.

Step 601: storing a currently output current and a currently output voltage of the voltage and current regulative main circuit, and controlling the current limit of the voltage and current regulative main circuit to be increased or decreased by a preset step size.

Step 602: calculating the difference in the output voltage of the voltage and current regulative main circuit before and after the adjustment of the current limit.

Step 603: estimating whether the difference is equal to 0, going to a step 604 if the difference is equal to 0; else, going to a step 605.

Step 604: decreasing the current limit of the voltage and current regulative main circuit by a preset first step size, and returning to the step 602.

Step 605: estimating whether the difference is greater than a preset difference threshold, going to a step 606 if the difference is greater than the preset difference threshold; else, going to a step 607.

Step 606: comparing the currently output current and the currently output voltage with the previously stored output current and voltage respectively, setting a state point including the output current and voltage with the smaller value as the steady-state operating point; and going to a step 608.

Here, the current limit before and after the adjustment may also be stored, and the state point corresponding to the current limit with the smaller value is set as the steady-state operating point. Specifically, the current limit with the smaller value and the corresponding output voltage are set as the current and voltage of the steady-state operating point respectively.

Step 607: storing the currently output current and the currently output voltage, increasing the current limit of the voltage and current regulative main circuit by the first preset step size, and returning to the step 602.

Step 608: controlling the voltage and current regulative main circuit to work at the steady-state operating point.

Figure 7:
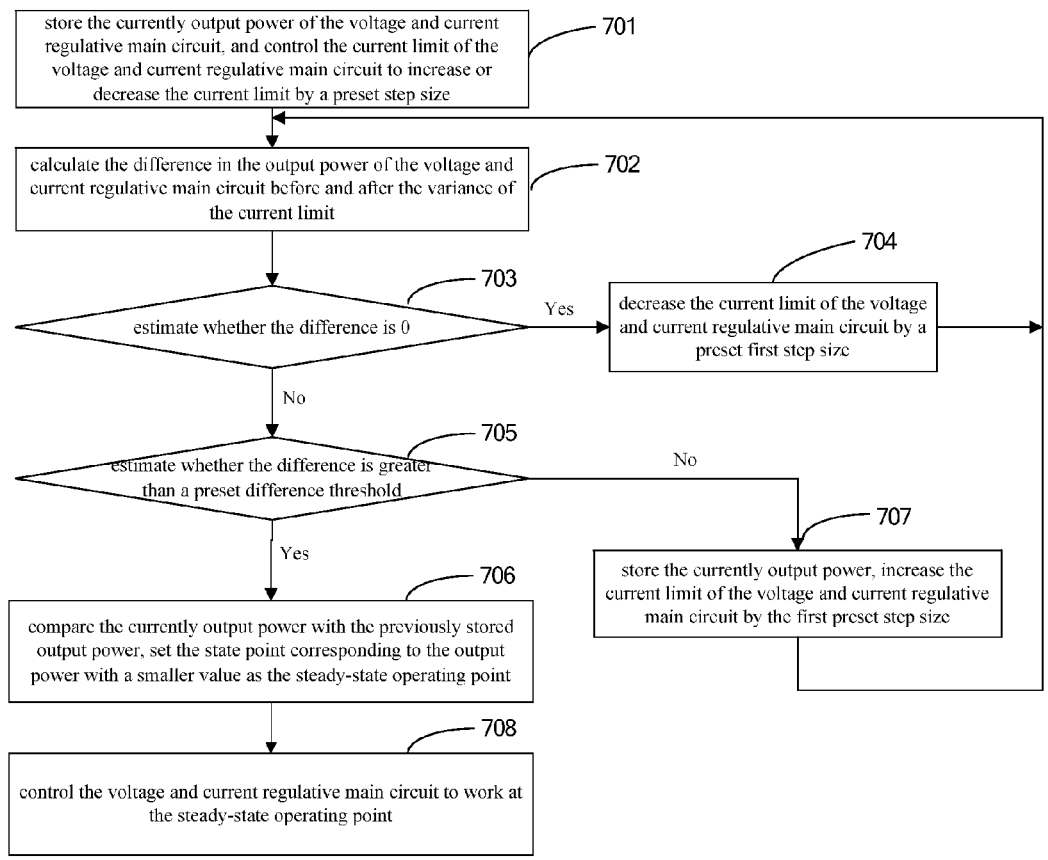
FIG. 7 is a schematic flow chart of another method for controlling a voltage and current regulative main circuit according to an embodiment of the invention.

When the sampled output characteristic parameter is the output power, the method for controlling the voltage and current regulative main circuit by the output current controller may include the following steps, as shown in FIG. 7.

Step 701: storing the currently output power of the voltage and current regulative main circuit, and controlling the current limit of the voltage and current regulative main circuit to increase or decrease the current limit by a preset step size.

Step 702: calculating the difference in the output power of the voltage and current regulative main circuit before and after the adjustment of the current limit.

Step 703: estimating whether the difference is equal to 0, going to a step 704 if the difference is equal to 0; else, going to a step 705.

Step 704: decreasing the current limit of the voltage and current regulative main circuit by a preset first step size, and returning to the step 702.

Step 705: estimating whether the difference is greater than a preset difference threshold, going to a step 706 if the difference is greater than a preset difference threshold; else, going to a step 707.

Step 706: comparing the currently output power with the previously stored output power, setting the state point corresponding to the output power with the smaller value as the steady-state operating point (i.e., setting the output voltage and the output current corresponding to the output power with the smaller value as the output voltage and the output current of the steady-state operating point); and going to a step 708.

Step 707: storing the currently output power, increasing the current limit of the voltage and current regulative main circuit by the first preset step size, and returning to the step 702.

Step 708: controlling the voltage and current regulative main circuit to work at the steady-state operating point.

When the sampled output characteristic parameter is the variation rate of the output voltage, the operation process may be implemented by referring to the steps in FIG. 6, which will not be described in detail here.

In the control method shown in FIG. 6 and FIG. 7, the preset first step size may be a constant, and may also be varied with the variance of a certain parameter during the adjustment process.

Hereinafter, the implementation principle of the method for determining the steady-state operating point shown in FIG. 6 and FIG. 7 will be described.

Figure 8:
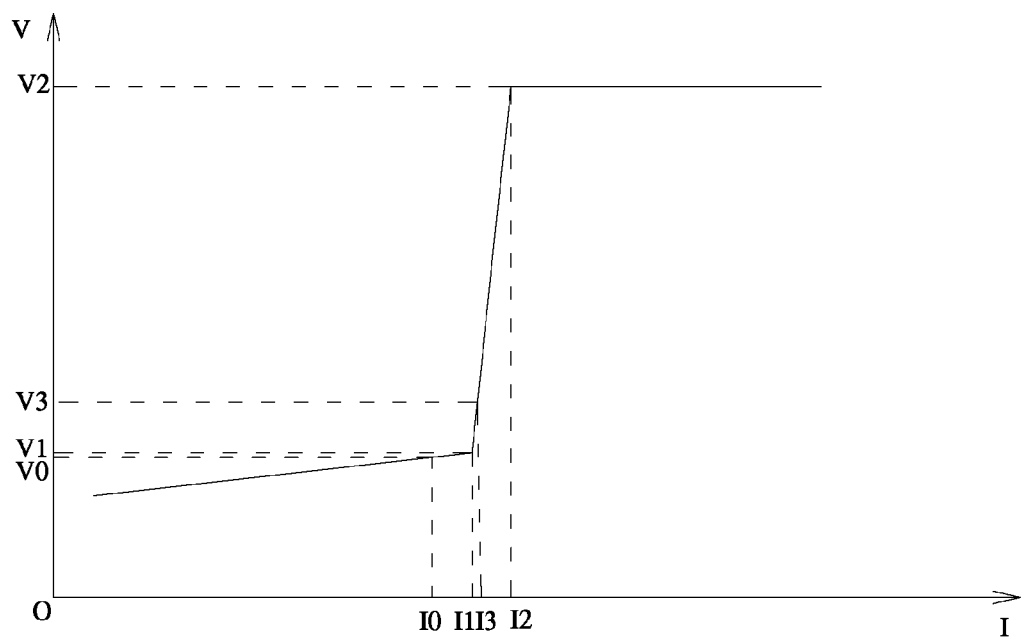
FIG. 8 is a schematic diagram of a relation between a current limit and an output voltage of a voltage and current regulative main circuit according to an embodiment of the invention.

In the load driving device and system shown in FIG. 3 and FIG. 4, the relation between the current limit and the output voltage of the voltage and current regulative main circuit is illuminated by FIG. 8 distinctly. In FIG. 8, a horizontal axis I represents the current limit of the current loop in the voltage and current regulative main circuit, which corresponds to the output current of the voltage and current regulative main circuit, and a vertical axis U represents the output voltage of the voltage and current regulative main circuit.

Based on the magnitude relation between the current limit Ic of the current loop in the voltage and current regulative main circuit and the sum Ir of the current limits of the load branches, the working states of the voltage and current regulative main circuit can be the following three states.

(1) When the current limit Ic of the current loop in the front-stage voltage and current regulative main circuit is greater than the sum Ir of the current limits of all the load branches in the post stage load unit, the voltage and current regulative main circuit works in a voltage regulation state, the voltage loop works, and the voltage and current regulative main circuit outputs the maximum output voltage Vo1. At this time, when the current limit Ic of the current loop is adjusted in the case that Ic is greater than Ir, the output voltage of the voltage and current regulative main circuit remains constant, which is equal to the maximum output voltage Vo1 of the voltage and current regulative main circuit all the time. For example, in the embodiment shown in FIG. 8, V2 is the maximum output voltage (corresponding to Vo1). I2 is a current limit corresponding to the maximum output voltage, and is a critical point at which the voltage and current regulative main circuit works in the voltage regulation state. When the current limit Ic of the current loop satisfies the formula of Ic>I2, the variance in the current limit Ic will not result in a variance in the output voltage V.

(2) When the current limit Ic of the current loop in the front-stage voltage and current regulative main circuit approximates to the sum Ir of the current limits of all the load branches, and the difference between Ic and Ir is within a small range (in this case, Ic ranges from I1 to I2), a sudden change will occur in the output voltage of the voltage and current regulative main circuit. In this case, if the current limit of the voltage and current regulative main circuit is decreased to be smaller than Ir, the output voltage will be reduced, and the state of the voltage and current regulative main circuit will switch from the voltage regulation state to a current-limiting state (i.e., switches from the state in which the voltage loop works to the state in which the current loop works). If the current limit of the current loop is increased to be greater than Ir, the output voltage will be raised, and the voltage and current regulative main circuit will switch from the current-limiting state to the voltage regulation state (i.e., switches from the state in which the current loop works to the state in which the voltage loop works). For example, as shown in FIG. 8, when the current limit Ic approximates to I1 in the direction of the arrow of the horizontal axis, or in the direction opposite to the arrow of the horizontal axis, the sudden change, i.e., from V1 to V2 or from V2 to V1, occurs in the output voltage in step.

(3) when the current limit Ic of the current loop in the front-stage voltage and current regulative main circuit is smaller than the sum Ir of the current limits of all the load branches, and the difference is outside the above range, the voltage and current regulative main circuit is in the current-limiting state (i.e., the state in which the current loop works), the output voltage of the voltage and current regulative main circuit is the voltage in the current-limiting state, i.e., the output voltage depends on the load voltage. For example, in the lighting system, due to the characteristics of the LED light, the current flowing through the LED light will result in the variance in the voltage of the LED light, and thus the change of the current limit will result in a slight variance in the output voltage; for example. As shown in FIG. 8, when the current limit Ic of the current loop satisfies the formula of Ic<I1, the output voltage V will be increased with the increasing of the current limit Ic, and the output voltage V will be decreased with the decreasing of the current limit Ic.

In FIG. 8, I1 in the operating point (V1, I1) indicates the current limit Ic of the current loop in the voltage and current regulative main circuit which is just equal to the sum Ir of the current limits of the post stage LED loads, and V1 is the output voltage corresponding to this I1.

In practice, the operating point of the voltage and current regulative main circuit is preferably set nearby the operating point (V1, I1). In the embodiment of the invention, a process for detecting the steady-state operating point is to find the operating point (V1, I1) or the operating points close to the operating point (V1, I1), so that the current limit Ic of the current loop in the voltage and current regulative main circuit is provided nearby the sum Ir of the current limits of the post stage LED loads.

If the current limit Ic of the current loop in a steady state is slightly smaller than the sum Ir of the current limits of the post stage LED loads, the main circuit works in the current-limiting state, and the output voltage is slightly larger than the highest voltage of the LED light.

If the current limit Ic of the current loop in the steady state is just equal to the sum Ir of the current limits of the post stage LED loads, the main circuit works at a critical point between the current-limiting state and the voltage regulation state, and the output voltage is just equal to the highest voltage of the LED light.

If the current limit Ic of the current loop in the steady state is slightly larger than the sum Ir of the current limits of the post stage LED loads, the main circuit is controlled to work in the voltage regulation state, and the voltage limit is slightly larger than the output voltage corresponding to the sum Ir of the current limits (and smaller than the maximum output voltage Vo1), and the output voltage is slightly larger than the highest voltage of the LED light.

For example, as shown in FIG. 8, when the current limit of the current loop in the voltage and current regulative main circuit is adjusted to be increased (i.e., in the direction of the arrow of the horizontal axis in FIG. 8), the steady-state operating point is closed to the operating point (V1, I1) before the sudden change of the output voltage, which can be an operating point (V0, I0) slightly smaller than the current limit, or an operating point (V3, I3) slightly larger than the current limit. When the current limit of the current loop in the voltage and current regulative main circuit is adjusted to be decreased (i.e., in the direction opposite to the arrow of the horizontal axis in FIG. 8), the steady-state operating point is closed to the operating point (V1, I1) after the sudden change of the output voltage, which can be an operating point (V0, I0) slightly smaller than the current limit, or an operating point (V3, I3) slightly larger than the current limit.

It is to be noted that the current limit Ic of the current loop in the voltage and current regulative main circuit is provided nearby the sum Ir of the current limits of the post stage LED loads. Preferably, the difference $\Delta I$ between Ic and Ir is within the range of $(\pm 0.1\% \sim \pm 10\%)$Ir. In the example of FIG. 8, I1 is the sum Ir of the post stage current limits, and the selection of the steady-state operating point Ic needs to ensure that the difference $\Delta I$ between Ic and I1 is within the range of $(\pm 0.1\% \sim \pm 10\%)$I1.

It is to be noted that when the amount of the load branch varies, for example, when the load branch is cut off or another branch is added, the steady-state operating point of the circuit will be re-determined through the sampling unit by adjusting the output current controller, and the output voltage of the voltage and current regulative main circuit may be adjusted based on the steady-state operating point of the circuit. It is achieved that if some load branch is cut off, the currents of the other load branches remain constant, and if some load branch is added, the currents of the existing load branches remain constant, the current in the added load branch is equal to the current limit set for this load branch.

Figure 9:
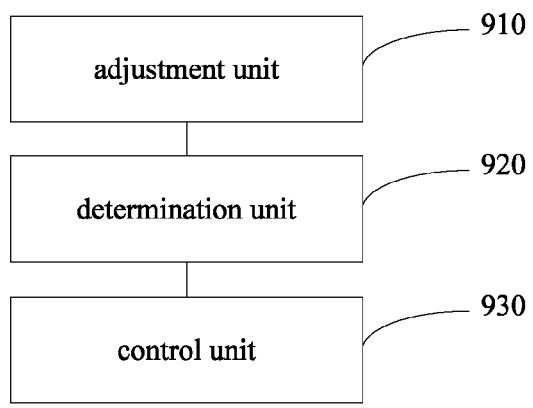
FIG. 9 is a schematic diagram of a device for controlling a voltage and current regulative main circuit according to an embodiment of the invention.

Corresponding to the solution of the above method for controlling the voltage and current regulative main circuit, a device for controlling the voltage and current regulative main circuit is further provided according to an embodiment of the invention, as shown in FIG. 9. The device may include:

an adjustment unit 910 adapted to adjust a current limit of a voltage and current regulative main circuit by a preset step size;

a determination unit 920 adapted to determine a steady-state operating point of the voltage and current regulative main circuit based on the current limit or a output characteristic parameter before and after the adjustment of the current limit when it is determined that the difference in the output characteristic parameter of the voltage and current regulative main circuit before and after the adjustment of the current limit is greater than a preset difference threshold; and a control unit 930 adapted to control the voltage and current regulative main circuit to work at the steady-state operating point.

The determination unit 920 may include:

an estimating sub-unit adapted to estimate whether a difference in the output characteristic parameter of the voltage and current regulative main circuit before and after the adjustment is greater than 0 or whether the difference is greater than the preset difference threshold; when it is estimated that the difference in the output characteristic parameter of the voltage and current regulative main circuit before and after the adjustment is equal to 0, control the adjustment unit to decrease the current limit of the voltage and current regulative main circuit by the preset step size; when it is estimated that the difference in the output characteristic parameter of the voltage and current regulative main circuit before and after the adjustment is not equal to 0 and is smaller than the preset difference threshold, control the adjustment unit to increase the current limit of the voltage and current regulative main circuit by the preset step size; when it is estimated that the difference in the output characteristic parameter of the voltage and current regulative main circuit before and after the adjustment is greater than the preset difference threshold, control the determination sub-unit to determine the steady-state operating point; and a determination sub-unit adapted to determine the steady-state operating point of the voltage and current regulative main circuit based on the current limit or the output characteristic parameter before and after the adjustment.

Preferably, the determination sub-unit may be adapted to compare the values of two current limits before and after the adjustment, and set a current limit with the smaller value and an output voltage of the voltage and current regulative main circuit corresponding to the current limit with the smaller value as the current and the voltage of the steady-state operating point; or the determination sub-unit may be adapted to compare the values of two output characteristic parameters before and after the adjustment, and set a current limit and an output voltage of the voltage and current regulative main circuit corresponding to an output characteristic parameter with the smaller value as the current and the voltage of the steady-state operating point.

With the above control method and device, in conjunction with the sampling unit, the voltage and current regulative main circuit may be controlled to work at the steady-state operating point, and thus the driving of the post stage load unit is achieved.

The above are only the preferred embodiments of the invention, and it should be noted that any modifications and variations may be made by those ordinary skilled in the art without deviating from the principle of the invention, which should also be considered as within the scope of protection of the invention.

The invention claimed is:

1. A load driving device, comprising:

A voltage and current regulative main circuit adapted to perform a voltage conversion on an input voltage under the control of an output current controller, and supply electric power to a load unit in a post stage;

a sampling unit connected to an output terminal or two output terminals of the voltage and current regulative main circuit, and adapted to sample an output characteristic parameter of the voltage and current regulative main circuit and transmit to an output current controller the sampled signal obtained by the sampling; and the output current controller having an input terminal connected to an output terminal of the sampling unit, and adapted to control a current limit of the voltage and current regulative main circuit, determine a steady-state operating point of the voltage and current regulative main circuit based on an adjustment direction of the current limit and on a variation in the output characteristic parameter of the voltage and current regulative main circuit before and after the adjustment the current limit, and control the voltage and current regulative main circuit to work at the steady-state operating point;

wherein the steady-state operating point refers to the current limit of the voltage and current regulative main circuit which differs from the sum (Ir) of the current limits of the LED load branches in the post stage by a preset difference threshold ($\Delta I$), and the output voltage of the voltage and current regulative main circuit.

2. The device according to claim 1, wherein the voltage and current regulative main circuit comprises:

a switch converter having a first output terminal serving as a first output terminal of the voltage and current regulative main circuit and a second output terminal serving as a second output terminal of the voltage and current regulative main circuit, and adapted to perform the voltage conversion on the input voltage under the control of a current loop or a voltage loop;

the current loop adapted to sample an output current of the switch converter, and control the output current of the switch converter based on a current limit, in the case that the switch converter is controlled based on the sampled current; and the voltage loop adapted to sample an output voltage of the switch converter, and control the output voltage of the switch converter based on a voltage limit, in the case that the switch converter is controlled based on the sampled voltage, wherein the output current controller is adapted to control the current limit of the voltage and current regulative main circuit by controlling the current limit of the current loop.

3. The device according to claim 2, wherein the output characteristic parameter is an output voltage, a variation rate of the output voltage, or an output power.

4. The device according to claim 2, wherein the output current controller is adapted to:

adjust the current limit of the voltage and current regulative main circuit by a preset step size; determine the steady-state operating point of the voltage and current regulative main circuit based on the current limit or the output characteristic parameter before and after the adjustment the current limit, in the case that it is determined that the difference in the output characteristic parameter of the voltage and current regulative main circuit before and after the adjustment of the current limit is greater than a preset difference threshold; and control the voltage and current regulative main circuit to work at the steady-state operating point.

5. A load driving system, further comprising:

a voltage and current regulative main circuit adapted to perform a voltage conversion on an input voltage under the control of an output current controller, and supply electric power to a load unit in a post stage;

a load unit comprising at least one load branch, a first end of the load branch being connected to a first end of the load unit and a second end of the load branch being connected to a second end of the load unit, wherein the first end of the load unit is connected to a first output terminal of the voltage and current regulative main circuit and the second end of the load unit is connected to a second output terminal of the voltage and current regulative main circuit;

a sampling unit connected to an output terminal or two output terminals of the voltage and current regulative main circuit, and adapted to sample an output characteristic parameter of the voltage and current regulative main circuit and transmit to an output current controller the sampled signal obtained by the sampling; and the output current controller having an input terminal connected to an output terminal of the sampling unit, and adapted to control a current limit of the voltage and current regulative main circuit, determine a steady-state operating point of the voltage and current regulative main circuit based on an adjustment direction of the current limit and on a variation in the output characteristic parameter of the voltage and current regulative main circuit before and after the adjustment of the current limit, and control the voltage and current regulative main circuit to work at the steady-state operating point;

wherein the steady-state operating point refers to the current limit of the voltage and current regulative main circuit which differs from the sum (Ir) of the current limits of the LED load branches in the post stage by a preset difference threshold ($\Delta I$), and the output voltage of the voltage and current regulative main circuit.

6. The system according to claim 5, wherein the load branch comprises a set of loads connected in series and a current-limiting circuit for the load branch; and the current-limiting circuit is adapted to set a current limit of the load branch comprising the current-limiting circuit and control the current in the load branch to work at the current limit.

7. The system according to claim 6, wherein the current-limiting circuit comprises a first adjustment transistor and a resistor connected to the first adjustment transistor in series, wherein two ends of the resistor are connected to two input terminals of a current-limiting controller respectively, an output terminal of the current-limiting controller controls an output impedance of the first adjustment transistor, the current-limiting controller is adapted to control the first adjustment transistor based on the current in the resistor, so as to control the current in the corresponding load branch to be not greater than a preset current value; or the current-limiting circuit is a current regulative diode.

8. A method for controlling a current limit of a voltage and current regulative main circuit, comprising:

adjusting a current limit of a voltage and current regulative main circuit by a preset step size;

determining a steady-state operating point of the voltage and current regulative main circuit based on the current limit or a output characteristic parameter before and after an adjustment of the current limit, in the case that it is estimated that the difference in the output characteristic parameter of the voltage and current regulative main circuit before and after the adjustment of the current limit is greater than a preset difference threshold; and controlling the voltage and current regulative main circuit to work at the steady-state operating point;

wherein the steady-state operating point refers to the current limit of the voltage and current regulative main circuit which differs from the sum (Ir) of the current limits of the LED load branches in the post stage by a preset difference threshold ($\Delta I$), and the output voltage of the voltage and current regulative main circuit.

9. The method according to claim 8, further comprising:

the step of adjusting the current limit to decrease the current limit of the voltage and current regulative main circuit by the preset step size, in the case that it is estimated that the difference in the output characteristic parameter of the voltage and current regulative main circuit before and after the adjustment is equal to 0 (zero); or the step of adjusting the current limit to increase the current limit of the voltage and current regulative main circuit by the preset step size, in the case that it is estimated that the difference in the output characteristic parameter of the voltage and current regulative main circuit before and after the adjustment is not equal to 0 (zero) and is smaller than the preset difference threshold.

10. The method according to claim 8, wherein the determining a steady-state operating point of the voltage and current regulative main circuit based on the current limit or the output characteristic parameter before and after an adjustment comprises:

comparing the values of two current limits before and after the adjustment, and setting a current limit with a smaller value as a current of the steady-state operating point and setting an output voltage of the voltage and current regulative main circuit corresponding to the current limit with the smaller value as the voltage of the steady-state operating point; or comparing the values of two output characteristic parameters before and after the adjustment, and setting a current limit of the voltage and current regulative main circuit corresponding to the output characteristic parameter with a smaller value as the current of the steady-state operating point and setting an output voltage of the voltage and current regulative main circuit corresponding to the current limit as the voltage of the steady-state operating point.

11. A device for controlling a current limit of a voltage and current regulative main circuit, comprising:

an adjustment unit adapted to adjust a current limit of a voltage and current regulative main circuit by a preset step size;

a determination unit adapted to determine a steady-state operating point of the voltage and current regulative main circuit based on the current limit or an output characteristic parameter before and after an adjustment in the case that it is determined that the difference in the output characteristic parameter of the voltage and current regulative main circuit before and after the adjustment is greater than a preset difference threshold; and a control unit adapted to control the voltage and current regulative main circuit to work at the steady-state operating point;

wherein the steady-state operating point refers to the current limit of the voltage and current regulative main circuit which differs from the sum (Ir) of the current limits of the LED load branches in the post stage by a preset difference threshold ($\Delta I$), and the output voltage of the voltage and current regulative main circuit.

12. The device according to claim 11, wherein the determination unit comprises:

an estimating sub-unit adapted to estimate whether the difference in the output characteristic parameter of the voltage and current regulative main circuit before and after the adjustment is greater than 0 or whether the difference is greater than the preset difference threshold, and control the adjustment unit to decrease the current limit of the voltage and current regulative main circuit by the preset step size, in the case that it is estimated that the difference in the output characteristic parameter of the voltage and current regulative main circuit before and after the adjustment is equal to 0;

control the adjustment unit to increase the current limit of the voltage and current regulative main circuit by the preset step size, in the case that it is estimated that the difference in the output characteristic parameter of the voltage and current regulative main circuit before and after the adjustment is not equal to 0 and is smaller than the preset difference threshold; or control the determination sub-unit to determine the steady-state operating point in the case that it is estimated that the difference in the output characteristic parameter of the voltage and current regulative main circuit before and after the adjustment is greater than the preset difference threshold; and a determination sub-unit adapted to determine the steady-state operating point of the voltage and current regulative main circuit based on the current limit or the output characteristic parameter before and after the adjustment.

13. The device according to claim 12, wherein the determination sub-unit is adapted to compare the values of two current limits before and after the adjustment, and set the current limit with a smaller value as a current of the steady-state operating point and set an output voltage of the voltage and current regulative main circuit corresponding to the current limit with the smaller value as the voltage of the steady-state operating point; or the determination sub-unit is adapted to compare the values of two output characteristic parameters before and after the adjustment, and set a current limit of the voltage and current regulative main circuit corresponding to the output characteristic parameter with a smaller value as the current of the steady-state operating point and set an output voltage of the voltage and current regulative main circuit corresponding to the current limit as the voltage of the steady-state operating point.

14. The method according to claim 9, wherein the determining a steady-state operating point of the voltage and current regulative main circuit based on the current limit or the output characteristic parameter before and after an adjustment comprises:

comparing the values of two current limits before and after the adjustment, and setting a current limit with a smaller value as a current of the steady-state operating point and setting an output voltage of the voltage and current regulative main circuit corresponding to the current limit with the smaller value as the voltage of the steady-state operating point; or comparing the values of two output characteristic parameters before and after the adjustment, and setting a current limit of the voltage and current regulative main circuit corresponding to the output characteristic parameter with a smaller value as the current of the steady-state operating point and setting an output voltage of the voltage and current regulative main circuit corresponding to the current limit as the voltage of the steady-state operating point.

* * * * *